US012763829B2

(12) United States Patent
Dey et al.

(10) Patent No.: US 12,763,829 B2
(45) Date of Patent: Oct. 13, 2026

(54) SIGNALLING METHODS FOR A NETWORK WITH RECONFIGURABLE INTELLIGENT SURFACE AND REPEATERS

(71) Applicants: CENTRE OF EXCELLENCE IN WIRELESS TECHNOLOGY, Chennai (IN); INDIAN INSTITUTE OF TECHNOLOGY MADRAS (IIT MADRAS), Chennai (IN)

(72) Inventors: Priyanka Dey, Chennai (IN); Deepak Padmanabhan Maya, Chennai (IN); Abhijeet Abhimanyu Masal, Chennai (IN); Vikram Singh, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 105 days.

(21) Appl. No.: 18/699,030

(22) PCT Filed: Sep. 20, 2022

(86) PCT No.: PCT/IN2022/050836
§ 371 (c)(1),
(2) Date: Apr. 5, 2024

(87) PCT Pub. No.: WO2023/058045
PCT Pub. Date: Apr. 13, 2023

(65) Prior Publication Data

US 2024/0429979 A1 Dec. 26, 2024

(30) Foreign Application Priority Data

Oct. 8, 2021 (IN) ............................ 202141045980

(51) Int. Cl.
*H04B 7/06* (2006.01)
*H04B 7/04* (2017.01)
(Continued)

(52) U.S. Cl.
CPC ....... *H04B 7/0617* (2013.01); *H04B 7/04026* (2023.05); *H04B 17/14* (2015.01); *H04L 5/0005* (2013.01)

(58) Field of Classification Search
CPC .. H04B 7/0617; H04B 7/04026; H04B 17/14; H04L 5/0005
(Continued)

(56) References Cited

U.S. PATENT DOCUMENTS

2013/0083865 A1* 4/2013 Wu ...................... H04B 7/0619 375/267
2021/0281303 A1* 9/2021 Jeon ..................... H04B 7/0617
(Continued)

FOREIGN PATENT DOCUMENTS

WO 2021160689 A1 8/2021
WO WO-2022133958 A1 * 6/2022 ............. H04B 7/026
(Continued)

*Primary Examiner* — Leila Malek
(74) *Attorney, Agent, or Firm* — Tarter Krinsky & Drogin LLP

(57) ABSTRACT

A method of communication in a cellular network is described. The method comprises establishing, by at least one first node, a connection with at least one second node. At least one first node receives capability information of the at least one second node. One or more of the at least one first node, the at least one second node, and at least one third node calibrate a channel among one or more of the at least one first node, the at least one second node, and at least one third node. The at least one first node transmits control information to the at least one second node, based on at least one of the calibration information and the capability infor-
(Continued)

mation. The at least one second node beamforms signals transmitted to and received from the at least one third node

28 Claims, 3 Drawing Sheets

(51) Int. Cl.
*H04B 17/14* (2015.01)
*H04L 5/00* (2006.01)

(58) Field of Classification Search
USPC .......................................................... 375/267
See application file for complete search history.

(56) References Cited

U.S. PATENT DOCUMENTS

| | | | | |
|---|---|---|---|---|
| 2022/0322321 | A1* | 10/2022 | Dai | H04W 72/51 |
| 2023/0308140 | A1* | 9/2023 | Baligh | H04B 7/04013 |
| 2024/0275433 | A1* | 8/2024 | Li | H04B 17/391 |
| 2024/0364434 | A1* | 10/2024 | Sahraei | H04B 17/309 |

FOREIGN PATENT DOCUMENTS

| | | | | |
|---|---|---|---|---|
| WO | WO-2023000256 | A1 * | 1/2023 | H04B 7/0456 |
| WO | WO-2023000287 | A1 * | 1/2023 | H04B 7/04013 |

* cited by examiner

SIGNALLING METHODS FOR A NETWORK WITH RECONFIGURABLE INTELLIGENT SURFACE AND REPEATERS

FIELD OF THE INVENTION

The present invention relates to cellular communication systems, and more particularly to signalling methods for a network with reconfigurable intelligent surface and/or repeaters.

BACKGROUND OF THE INVENTION

A reconfigurable intelligent surface (RIS), also known as intelligent reflecting surface (IRS), is a surface consisting of multiple meta-elements which can introduce a phase shift and/or amplitude variation to the radio frequency (RF) signal. The meta-elements are only reflective in nature and are incapable of transmitting/receiving an RF signal, hence they are termed as passive elements. The reflecting surface is capable of directing an incident beam in a particular direction by intelligently reconfiguring the phase shift and/or amplitude variation induced by each meta-element using appropriate inputs from a controller circuit. There is a need of defining the signaling exchanges required between a network, a base station (BS), and an RIS, for efficient operation of the RIS in the network.

A repeater is a device having both transmit and receive RF chains with active antenna elements. A repeater only amplifies an incoming RF signal and re-transmits the RF signal without decoding, and therefore do not have any knowledge about content of the RF signal. A smart repeater is a conventional RF repeater with some intelligence. Introducing such a repeater in the wireless communication network is another cost-effective solution to achieve various benefits like an RIS. The effectiveness of the repeater and the system performance improve when a repeater is provided with some control information. For example, beamforming at repeater and transmitting the information towards a specific user's direction improves signal strength at the user, and also reduces the interference in the network. Further, repeaters are used in long term evolution (LTE) networks as a cost-effective solution to improve the coverage. However, the repeaters in LTE networks are omnidirectional, which retransmit the amplified signal uniformly in all directions. Thus, there is a need of defining the signaling exchanges required between a network, a BS, and a smart repeater, for efficient operation of the smart repeater in the network.

OBJECTS OF THE INVENTION

A general objective of the present invention is to provide signalling methods for activating and operating a reconfigurable intelligent surface (RIS) and/or a smart repeater in a network, to improve the overall performance of the network.

Another objective of the present invention is to provide control information to a RIS and/or a smart repeater from the network/base station, for efficient operation of the RIS and/or the smart repeater in the network.

Still another objective of the present invention is to provide methods to reduce energy consumption at a RIS and/or a smart repeater and efficient management techniques for the RIS and/or the smart repeater to reduce interference.

SUMMARY OF THE INVENTION

The present invention relates to a signalling method for a network with reconfigurable intelligent surface and/or repeaters.

A method of communication in a cellular network is described. The method comprises establishing, by at least one first node, a connection with at least one second node. The at least one first node receives capability information of the at least one second node. One or more of the at least one first node, the at least one second node and at least third node calibrate a channel among one or more of the at least one first node, the at least one second node, and the at least one third node. The at least one first node transmits control information to the at least one second node, based on at least one of the calibration information and the capability information. The at least one second node beamforms signals transmitted to and received from the at least one third node.

The first node is at least one of a Base Station (BS), an Integrated Access and Backhaul (IAB) node, and a Distributed Unit (DU), the second node is at least one of a smart repeater and a Reconfigurable Intelligent Surface (RIS), and the third node is at least one of the smart repeater, the RIS, IAB node, DU and a User Equipment (UE).

In one aspect, during establishing, the at least one first node identifies the at least one second node.

In one aspect, the at least one second node is identified by the at least one first node based on an information about the at least one second node, wherein the information comprises at least one of a location and availability of the at least one second node.

In one aspect, the information is provided by the cellular network to the at least one first node, and wherein the information is pre-configured at the at least one first node.

In one aspect, the information from the cellular network is obtained by sending a request by the at least one first node.

In one aspect, the capability information comprises at least one of configuration of elements, at least one number of at least one of phase shifts and amplitude levels supported by the at least one element, at least one value of at least one of phase shifts and amplitude levels supported by the at least one element, number of panels, mutual coupling between the at least one element, range of angle of incidence of an incoming beam, operating frequency range, frequency response, receiver capability, capability of performing channel estimation, and mobility information.

In one aspect, the capability of performing channel estimation is implicitly derived by the at least one first node from the receiver capability.

In one aspect, the at least one element comprises at least one of meta-element and antenna element.

In one aspect, the capability information is received through one of signaling by the network and reporting by the at least one second node.

In one aspect, transmitting the control information is performed using at least one of a dedicated channel and a shared channel.

In one aspect, the shared channel comprises at least one of time-frequency resources in at least one of a guard symbol and a guard band of a channel used for communication between the at least one first node and the at least one third node and time-frequency resources overlapping with the time-frequency resources used for communication between the at least one first node and the at least one third node.

In one aspect, the control information in the shared channel is multiplexed with at least one of a control signal, a reference signal (RS), and data signals of the at least one third node using at least one of time division multiplexing (TDM), frequency division multiplexing (FDM), code division multiplexing (CDM), spatial division multiplexing (SDM), non-orthogonal multiple access (NOMA), and multi-user multiple input multiple output (MIMO) techniques.

In one aspect, transmitting the control information comprises configuring, by at least one of the network and the at least one first node, the at least one second node parameters for transmission of control information, wherein the parameters are at least one of time resources, frequency resources, multiplexing modes, and periodicity.

In one aspect, calibrating the channel further comprises estimating, by the at least one second node, a beamforming matrix based on the calibration information.

In one aspect, when the at least one second node is capable of performing channel estimation, calibrating the channel comprises receiving, by the at least one second node, at least one of an RS configuration and scheduling information from the at least one first node, measuring by the at least one second node, RS transmitted by at least one of the at least one first node and the at least one third node based on at least one of the RS configuration and the scheduling information, and estimating, by the at least one second node, the channel between at least one of the at least one first node and the at least one second node, and the at least one second node and the at least one third node.

In one aspect, calibrating the channel comprises reporting a channel state information based on the estimated channel to the at least one first node and computing a beamforming matrix based on the estimated channel.

In one aspect, during calibration, the at least one first node may estimate the channel between the at least one first node and the at least one second node. Further, the at least one third node may estimate the channel between the at least one second node and the at least one third node. The at least one first node may estimate the channel between the at least one first node and the at least one third node. In addition, the at least one third node may estimate the channel between the at least one third node and the at least one first node.

In one aspect, during calibration, the at least one second node may receive the calibration information from at least one of the at least one first node and the at least one third node.

In one aspect, during calibration, the at least one third node may receive the calibration information from one or more of the at least one second node and the at least one first node.

In one aspect, transmitting the control information by the at least one first node comprises generating, by the at least one first node, a beamforming information based on available information about at least one of at least one second node and the at least one third node and transmitting, by the at least one first node, the beamforming information as control information to the at least one second node.

In one aspect, the available information is at least one of location information of the at least one third node, a feedback from the at least one third node regarding signal quality at the at least one third node, and channel information between at least one of the at least one first node and the at least one second node, the at least one second node and the at least one third node, and the at least one first node and the at least one third node.

In one aspect, the beamforming information comprises at least one of at least one value of at least one of phase shifts and amplitude levels supported by at least one element, a time resource where the beamforming information is to be applied and a periodicity information.

In one aspect, the at least one value of at least one of phase shifts and amplitude levels is represented by a beamforming matrix from a codebook.

In one aspect, the element comprises at least one of meta-element and antenna element.

In one aspect, the codebook is determined by at least one of the network, the at least one first node, and the at least one second node.

In one aspect, the codebook determined by the network is informed to at least one of the at least one first node and the at least one second node.

In one aspect, the codebook determined by the at least one second node is informed to the at least one first node.

In one aspect, the codebook determined by the at least one first node is informed to the at least one second node.

In one aspect, a periodicity information is transmitted along with the beamforming information.

In one aspect, beamforming a signal from the at least one second node to the at least one third node to destructively combine with an interfering signal at the at least one third node.

In one aspect, beamforming the signal comprises sending to the at least one second node one or more of an interference feedback by at least one of the at least one third node and the network, beam information of a second beam and a direction of transmission of a second beam. The second beam is the beam between the at least one second node and the at least one third node.

In one aspect, the at least one second node may determine at least one of beamforming in time resources, a sleep mode, and a low transmit power mode.

In one aspect, the at least one of beamforming in time resources, a sleep mode, and a low transmit power mode are determined based on at least one of a scheduling information and a resource configuration.

In one aspect, the at least one second node determines at least one of the scheduling information and the resource configuration by decoding at least one of the scheduling information and the resource configuration transmitted by the at least one first node meant for the at least one third node. Alternatively, the scheduling information and the resource configuration may be determined by decoding at least one of the scheduling information and the resource configuration transmitted as control information by the at least one first node to the at least one second node.

In one aspect, the sleep mode comprises turning off by the at least one second node, at least one of transmission and reception of at least one of data signal, control signal, and reference signal.

In one aspect, the low transmit power mode comprises reducing the transmit power by the at least one second node.

In one aspect, the low transmit power mode comprises reducing the transmit power for at least one of data signal, control signal, and reference signal by the at least one second node.

In one aspect, at least one of the sleep mode and the low transmit power mode is determined using an explicit indication from the at least one first node.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 1:
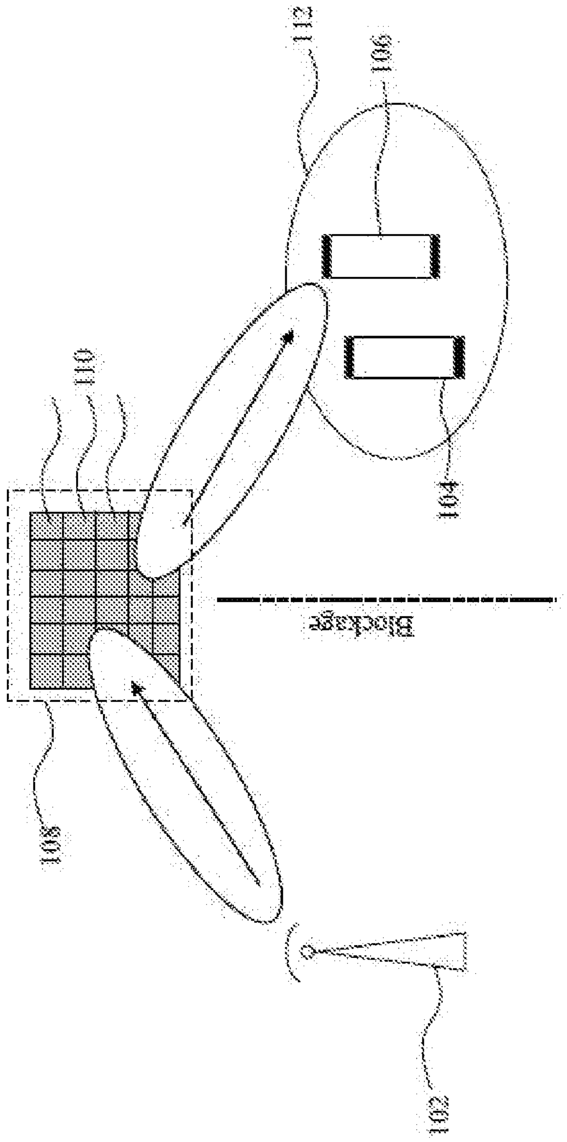
FIG. 1 illustrates a cellular network utilizing a reconfigurable intelligent surface (RIS), in accordance with an embodiment of the present invention.

FIG. 1 illustrates a cellular network (alternatively referred as a wireless communication network) utilizing an RIS (108), in accordance with prior art. The RIS (108) includes multiple meta-elements (110). Each meta-element (110) consists of a varactor diode whose capacitance is tuned by changing the bias voltage by providing appropriate input using the controller circuit. Change in capacitance of a varactor diode results in a change in phase shift introduced by a corresponding meta-element (110). The amount of phase shift/amplitude introduced by each meta-element (110) depends on factors like the properties, shape, size of the material, the bias voltage, the frequency of the incident RF signal, the angle of incidence of the RF signal etc. These values of phase shift/amplitude levels of the meta-elements (110) can be written as a beamforming matrix, which is very similar to a beamforming matrix of an active antenna array system.

The capability of an RIS to perform passive beamforming can be utilized in a wireless communication network to achieve various benefits, such as coverage extension, diversity, interference mitigation, etc. For example, in FIG. 1, region A (112) is not covered by a base station (BS) (102), due to some blockage (no line of sight (LoS) path), and/or the non-line of sight (NLOS) paths between the BS (102) and user equipments (UEs) (104, 106) have very poor signal strength. In such scenario, the region A (112) may also be known as a dead zone. This scenario can be overcome by deploying another BS in the region A (112). However, the cost involved in deploying and maintaining such an additional BS is relatively high. Therefore, a cost effective implementation may include usage of the RIS (108) to cover the region A (112) by reflecting the signal from the BS (102). The signal from the BS (102) may be reflected depending on the beamforming matrix in such a way that it beamforms the signal in a passive manner to the UEs (104, 106) in the region A (112), and therefore does not consume a lot of power.

When the RIS (108) is introduced in the wireless communication network, it must operate under the control of the BS (102) and a network to serve its purpose. Hence, there is a need for signaling exchanges among the network, the BS (102) and the RIS (108) for the efficient functioning of RIS (108). The new radio (NR) and long-term evolution (LTE) standards do not have any specification support for adding RISs in the network. Moreover, it is preferable to have an RIS (108) transparent to UEs (104, 106) so that no additional signaling is required to be sent to the UEs (104, 106) while the UEs (104, 106) receive the signal reflected by the RIS (108). Present invention describes the signaling exchanges required between a network, a BS (102), and an RIS (108), for efficient operation of the RIS (108) in the network.

Figure 2:
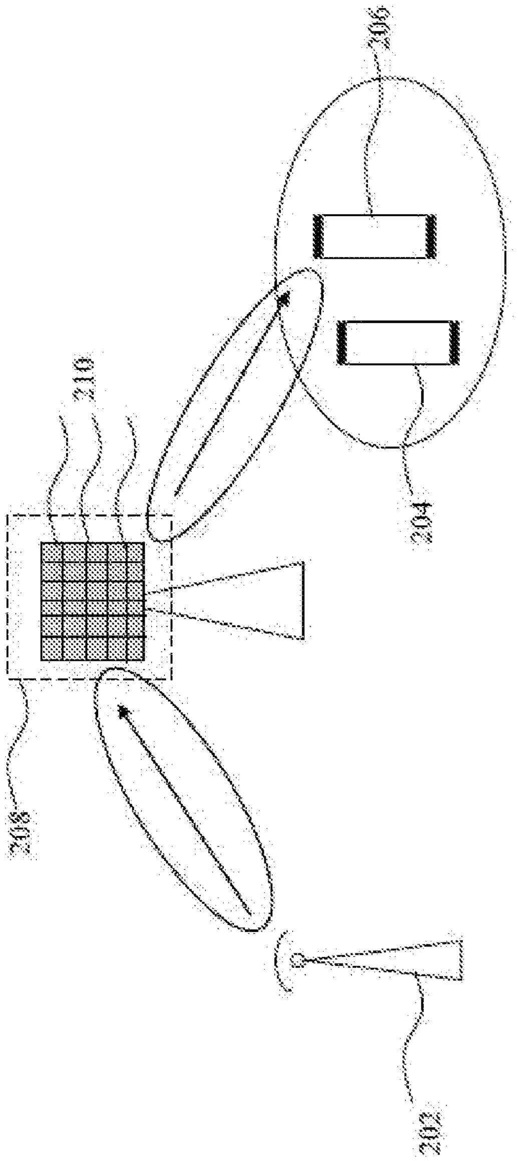
FIG. 2 illustrates a cellular network utilizing a smart repeater, in accordance with an embodiment of the present invention.

FIG. 2 illustrates a cellular network utilizing a smart repeater (208). The smart repeater (208) is capable of beamforming a signal to be re-transmitted in analog domain as the smart repeater (208) does not decode the signal to obtain digital form of the signal and apply digital domain beamforming/precoding. As shown in FIG. 2, the smart repeater (208) receives the signal from a base station (BS) (202) and re-transmits the signal to user equipments (UEs) (204, 206) in region A (212) on a different beam. Similar to the case of RIS (108), a re-transmitted beam depends upon a beamforming matrix. The antenna array elements used for transmission and reception are configured with specific phase and amplitude weights based on the beamforming matrix. Further, the smart repeater (208) operates under the control of a BS (202) and the network. Thus, considering the similarities between an RIS (108) and a smart repeater (208), most of the signaling exchanges required for RIS (108) are applicable for smart repeaters (208). Present invention covers the signaling techniques for both RIS (108) and smart repeaters (208). In the details provided in successive sections, wherever any signaling method is applicable for both RIS (108) and smart repeaters (208), it is mentioned as "RIS/smart repeater" (108, 208).

The present invention relates to signalling methods for activating and operating a RIS and/or smart repeater (108, 208) in a network, to improve the overall performance of the network. The present invention provides control information to be transmitted to the RIS and/or smart repeaters (108, 208) from the network/base station (BS) (102, 202), for efficient operation of the RIS and/or the smart repeater (108, 208) in the network. The present invention provides methods to reduce energy consumption at the RIS and/or the smart repeater (108, 208) and efficient management techniques for the RIS and/or the smart repeater (108, 208) to reduce interference.

In one embodiment, a RIS/smart repeater (108, 208) in a network is initialized. The RIS/smart repeater (108, 208) is deployed in the network in two scenarios. In a first scenario, the RIS/smart repeater (108, 208) will be deployed to aid a fixed BS (102, 202) or a set of BSs (102, 202) to serve UEs (104, 106, 204, 206) associated with them. The knowledge of location of the RIS/smart repeater (108, 208) is available to the BSs (102, 202) aiding the RIS/smart repeater (108, 208). In a second scenario, the BSs (102, 202) access the RIS/smart repeater (108, 208) on a need basis. For example, when a mobile BS (102, 202) finds the signal strength in a particular direction to be very poor, the mobile BS (102, 202) requests the network to provide information about an available RIS/smart repeater (108, 208) in that location. The network in turn informs the BS (102, 202) about the information of availability of the RIS/smart repeater (108, 208), and when requested, activates the RIS/smart repeater (108, 208) to serve the BS (102, 202). The network also hares necessary configuration information about the RIS/smart repeater (108, 208) to the BS (102, 202).

In one embodiment, the capability of the RIS/smart repeater (108, 208) should be known to the BS (102, 202) to dictate the RIS/smart repeater (108, 208) to work according to the requirements of the network. For example, when the RIS/smart repeater (108, 208) informs the BS (102, 202) that the RIS/smart repeater (108, 208) is not capable of estimating the channel, the BS has to decide/estimate the beamforming matrix and provide the beamforming matrix to the RIS/smart repeater (108, 208). Hence, the capability information of the RIS/smart repeater (108, 208) should be made available to the BS (102, 202) by the network or the RIS/smart repeater (108, 208) itself.

In one aspect, the capability information of the RIS/smart repeater (108, 208) may be a meta-element (110, 210) or an antenna element configuration. This information helps the BS (102, 202) to understand the beamforming patterns possible at the RIS/smart repeater (108, 208). The configuration includes the number of elements available at the RIS/smart repeater (108, 208) along with its distribution in the vertical and horizontal direction. Configuration also includes whether and how the elements are grouped. For example, the meta-elements (110) in the RIS (108) are grouped in such a way that all elements within a group have the same phase shift. In case of presence of multiple panels, especially for smart repeaters (208), the information regarding the multiple panels is required to be shared with the BS (202).

In one aspect, the capability information of the RIS/smart repeater (108, 208) may be an information regarding phase shift and/or amplitude levels supported by the elements at the RIS/smart repeater (108, 208). This includes the different possible levels of amplitude at the elements and the number of such levels of phase shift and/or amplitude.

In one aspect, the capability information of the RIS/smart repeater (108, 208) may be an information regarding mutual coupling of meta-elements (110,210) or antenna elements or group of meta-elements or antenna elements.

In one aspect, the capability information of the RIS/smart repeater (108, 208) may be a range of angle of incidence of the incoming beam on the RIS (108, 208) that will result in the afore-mentioned phase and amplitude levels.

In one aspect, the capability information of the RIS/smart repeater (108, 208) may be an operating frequency range and frequency response of the RIS (108) and an operating frequency range of the smart repeater (208). The RIS (108) is generally required to operate in different frequency bands and response of meta-elements (110) may vary at different frequencies. For example, in case of a frequency division duplexed (FDD) network, a downlink (DL) from the BS (102) to the UE (104, 106) and an uplink (UL) from UE (104, 106) to the BS (102) are performed at different frequency bands. The BS (102) should have the information about an operating frequency range and a frequency response to configure the phase and amplitude factors to the meta-elements (110) efficiently. In case of smart repeaters (208), only the operating frequency ranges need to be known to the BS (202).

In one aspect, capability information of the RIS/smart repeater (108, 208) may be an information indicating whether the RIS/smart repeater (108, 208) is capable of performing channel estimation. In one implementation, an indication related to capability of RIS/smart repeater is explicit. In another implementation, the BS (102, 202) derives the indication implicitly from a receiver capability information. The receiver capability information may be obtained based on the channel estimation or equalization algorithm implemented at the RIS/smart repeater (108, 208) e.g., minimum mean square error (MMSE). If the RIS/smart repeater (108, 208) indicates in receiver capability that it uses MMSE, then the BS (102, 202) assumes that it is capable of channel estimation. In case the RIS/smart repeater (108, 208) is capable of channel estimation, then the RIS/smart repeater (108, 208) either estimates the channel and sends it to the BS (102, 202) as a feedback or uses the estimated channel information to decide the beamforming matrix. However, since the BS (102, 202) is a master unit controlling operation of the RIS/smart repeater (108, 208), the BS (102, 202) decides and informs the network/RIS/smart repeater to perform either of the aforementioned operations.

In one implementation, receive RF chains capable of estimating the channels between the RIS (108) and the BS (102) and the channels between the RIS (108) and the UE (104, 106) can be added at the RIS (108). Depending upon the presence of the RF chains added at the RIS (108), is the RIS (108) may be classified into two categories, namely RIS (108) with channel estimation capability and RIS (108) without channel estimation capability. In case the RIS (108) has channel estimation capability, the RIS (108) has receiver RF chains associated with sensors installed on the RIS (108). The channel between the BS (102) and the RIS (108) and the channel between the UE (104, 106) and the RIS (108) are estimated by using signals received from the BS/UE (102, 104, 106), by the sensor present on the RIS (108). However, the estimated channel will be different from the channel experienced by the meta-elements (110) but might have some correlation. Therefore, various signal processing techniques like interpolation have to be used to obtain the channel at the meta-elements (110). In case the RIS (108) does not have channel estimation capability, the RIS (108) may not have any receiver chain to estimate the channel. The BS (102) determines the beamforming matrix using signal processing algorithm to inform the RIS (108), and this information is used to set the phase shift/amplitude levels.

In one aspect, the capability information of the RIS/smart repeater (108, 208) may be an information regarding mobility of RIS/smart repeater (108, 208).

In one embodiment, a control channel may be established between the BS (102, 202) and the RIS/smart repeater (108, 208). The BS (102, 202) may need to communicate with the RIS/smart repeater (108, 208) to obtain certain control information like the beamforming matrix using a control channel. The control channel is either wired or wireless channel. In case of a wireless channel, either dedicated resources are used for exchanging control information between the BS (102, 202) and the RIS/smart repeater (108, 208), or the resources are shared with the resources used for exchanging control/data signals between the BS (102, 202) and the UE (104, 106, 204, 206). The RIS/smart repeater (108, 208) may need to have at least one receiving antenna and RF chain to receive the control information from the BS (102, 202) and decode the control information.

In one aspect, the control channel may include a fixed set of time-frequency resources known to the BS (102, 202) and the RIS/smart repeater (108, 208). For example, the control information may be exchanged between the BS (102, 202) and the RIS/smart repeater (108, 208) using time-frequency resources in guard symbol/guard band of a BS-UE link. In case of periodic transmission of control information, periodicity of transmission should be known to the RIS/smart repeater (108, 208). Otherwise, the RIS/smart repeater (108, 208) may be required to continuously monitor the presence of control information and decode the control information whenever available.

In one aspect, the control information may be exchanged between the BS and the RIS/smart repeater (108, 208) using a set of resources overlapping with the time-frequency resources used by the BS (102, 202) to communicate with the UE (104, 106, 204, 206). For example, non-orthogonal multiple access (NOMA) can be used as a modulation technique where the control information for the RIS/smart repeater (108, 208) is transmitted at a lower power as compared to the control/data for the UE in the same time frequency resources or using other techniques such as multi-user multiple input multiple output (MIMO). In NOMA, lower power is used for transmitting to the RIS/smart repeater (108, 208) because it is nearer to the BS (102, 202) and has a strong LoS channel. The RIS/smart repeater (108, 208) performs successive interference cancellation (SIC) to extract its control information. However, to perform SIC, details of the modulation technique used by the BS (102, 202) for transmitting the control/data signals to the UE (104, 106, 204, 206) should be known to the RIS/smart repeater (108, 208). Therefore, the BS (102, 202) signals details of the modulation technique to the RIS/smart repeater (108, 208).

In one implementation, calibration of beamforming matrix may be performed at the RIS/smart repeater (108, 208). Once the complete capability of the RIS/smart repeater (108, 208) is known, either the BS (102, 202) or the network configures the phase shifts and/or the amplitude levels at the RIS/smart repeater (108, 208) so that the desired beamforming is achieved.

In case the RIS/smart repeater (108, 208) is capable of channel estimation, the RIS/smart repeater (108, 208) estimates the channel between the BS (102, 202) and the RIS/smart repeater (108, 208), as well as the channel between the UE and the RIS/smart repeater (108, 208). As mentioned earlier, either this channel information is reported to the BS (102, 202) as a feedback or the RIS/smart repeater (108, 208) uses the channel information to estimate the beamforming matrix. In both the scenarios, the control information needs to be provided by the BS (102, 202) or the network to the RIS/smart repeater (108, 208).

In one scenario, the RIS/smart repeater (108, 208) may receive a reference signal (RS) configuration of the BS (102, 202) and the time-frequency resources in which the BS (102, 202) transmits RS to estimate the channel between the BS (102, 202) and the RIS/smart repeater (108, 208). Also, the RIS/smart repeater (108, 208) may receive a reference signal (RS) configuration of the UE (104, 106, 204, 206) and the time-frequency resources in which the UE (104, 106, 204, 206) transmits RS signal to estimate the channel between the UE (104, 106, 204, 206) and the RIS/smart repeater (108, 208). Based on the RS configuration, the RIS/smart repeater (108, 208) estimates the channel.

In one scenario, when the RIS/smart repeater (108, 208) decides the beamforming matrix on its own, the beamforming matrix to be used for communicating with each user is determined based on the estimated channel between the RIS/smart repeater (108, 208) and the UE. Successively, the RIS/smart repeater (108, 208) may need to know scheduling information from the BS (102, 202), i.e., the time-frequency resources in which the BS (102, 202) transmits control signals or data signals to a UE (104, 106, 204, 206) or receives control signals or data signals from a UE (104, 106, 204, 206), based on which the RIS/smart repeater decides when to apply the beamforming matrix.

In one exemplary implementation, two UEs (104, 106, 204, 206) may be present in a coverage region of the RIS/smart repeater (108, 208). Then, the RIS/smart repeater (108, 208) may estimate the channel corresponding to each UE (104, 106, 204, 206) and decide the beamforming matrix to be used while communicating with each UE (104, 106, 204, 206). Scheduling information from the BS (102, 202) may indicate that the BS (102, 202) is transmitting to a UE1 in a first time instant and receiving from a UE2 in a second time instant, then the RIS/smart repeater (108, 208) may use a beamforming matrix corresponding to the UE1 in the first time instant and use a beamforming matrix corresponding to UE2 in the second time instant.

In case of a time division duplexed (TDD) network, a TDD resource configuration and the scheduling information are provided to the RIS/smart repeater (108, 208) for efficient operation. Further, in case of TDD, the channel between the BS (102, 202) and the RIS/smart repeater (108, 208) is considered same as channel between the RIS/smart repeater (108, 208) and the BS (102, 202). This is because DL and UL are performed in same frequency bands, resulting in channel being reciprocal. Similar assumptions are made on the channel between the RIS/smart repeater (108, 208) and the UE (108, 208). Therefore, same beamforming matrix is used for both DL and UL.

In case of a frequency division duplexed (FDD) network. DL and UL are performed at different frequency bands. Hence, especially in case of the RIS (108) where the response of the meta-elements (110) vary based on different frequency bands, channel reciprocity will not be present. Therefore, the channel between the RIS (108) and the UE (104, 106) may be required to be estimated by the UE (104, 106) and reported to the RIS/BS (108, 102). Similarly, the channel between the RIS (108) and the BS (102) may need to be estimated by the BS (102) and reported to the RIS (108) on a need basis.

In case the RIS/smart repeater (108, 208) is not capable of performing channel estimation, the individual channel between the BS (102, 202) and the RIS/smart repeater (108, 208) and the channel between the RIS/smart repeater (108, 208) and the UE (104, 106, 204, 206) may not be available at the BS (102), and the BS (102, 202) may be required to decide the beamforming matrix to be used at the RIS/smart repeater (108, 208) based on certain available information and update the beamforming matrix at the RIS/smart repeater (108, 208).

In one implementation, the BS (102, 202) may decide the beamforming matrix based on available location of the UE(s) (104, 106, 204, 206) served by the BS (102, 202). A best suitable beam to serve the UE(s) (104, 106, 204, 206) is decided/calculated by the BS (102, 202) based on the location information and a corresponding beamforming matrix is configured at the RIS/smart repeater (108, 208).

In one aspect, a channel between the BS (102, 202) and the RIS/smart repeater (108, 208), which is mostly LOS and remains almost constant over a long period of time, may be known at the BS (102, 202) by some calibration process. The BS (102, 202) may also have the combined channel between the UE (104, 106, 204, 206), the RIS/smart repeater (108, 208), and the BS (102, 202). Using this information, the BS (102, 202) may estimate an optimum beamforming matrix which maximises a signal to noise ratio (SNR) at the UE(s) (104, 106, 204, 206). Also, the BS (102, 202) uses a feedback from the UE(s) (104, 106, 204, 206) which provides information of signal quality at the UE(s) (104, 106, 204, 206). Such feedback may be used to determine a beamforming matrix. The information regarding the beamforming matrix may be sent to the RIS/smart repeater (108, 208) using a control channel.

In one aspect, the beamforming matrix may be updated at the RIS/smart repeater (108, 208) by the network or the BS (102, 202) that provides the phase shift and/or amplitude of each meta-element (110, 210) or antenna element or group of meta-elements or antenna elements at the RIS/smart repeater (108, 208). In this manner of updating the beamforming matrix, a signaling overhead directly proportional to the number of elements and the number of phase shift/amplitude levels available at the RIS/smart repeater (108, 208) may get introduced.

In one implementation, the beamforming matrix may be updated at the RIS/smart repeater (108, 208) by a codebook consisting of possible beamforming matrices at the RIS/smart repeater (108, 208). The codebook may be determined by either the network or the BS (102, 202) based on the capability information of the RIS/smart repeater (108, 208). Both the BS (102, 202) and the RIS/smart repeater (108, 208) may have a common knowledge regarding the codebook. In this method, the signaling overhead may get reduced to a great extent as compared to the previous method. For example, an area served by the RIS (108) may be divided into four regions. Each region may be served by a different beam given by a particular beamforming matrix. Thus, the codebook will consist of four beamforming matrices. The BS (102) has to signal the RIS/smart repeater (108, 208) to use one of these four matrices at a given point of time.

In one implementation, the beamforming matrix may be updated at the RIS/smart repeater (108, 208) by the network that determines one or more codebooks corresponding to the RIS (108) based on a configuration of elements at the RIS (108), operating frequency ranges, frequency response etc. The network informs the BS (102) and the RIS (108) about the one or more codebooks applicable for the RIS (108). Also, the RIS (108) informs a codebook to the BS (102) when the RIS (108) knows the codebook corresponding to its own capability. The BS (102) may use this codebook to update the beamforming matrix at the RIS (108). Thus, this method may not require full meta-elements (110) configuration to be shared with the BS (102).

In one implementation, a best beamforming matrix may be decided from the codebook based on location information and feedback from the UE (104, 106, 204, 206). For example, the BS (102, 202) may maintain a pre-determined lookup table mapping channel state information (CSI) and corresponding beamforming matrix. Thus, based on the CSI feedback received from the UE (104, 106, 204, 206), the BS (102, 202) may choose the best beamforming matrix and informs it to the RIS/smart repeater (108, 208).

In one implementation, the beamforming matrix may be updated at the smart repeaters by the BS (202) that provides beamforming matrices with different beam configurations that the smart repeater (208) uses to communicate with the UEs (204, 206). Based on a feedback received from the UE (204, 206), the BS (202) may determine a best beam which the smart repeater should use to communicate with the UE (204, 206). Details of such beam or the beamforming matrix may be informed to the smart repeater (108, 208).

In one implementation, the BS (102, 202) may broadcast synchronization signal block (SSB) in DL with certain periodicity and beamforming, which helps the UE (104, 106, 204, 206) in identifying, synchronizing, and attaching with the BS (102, 202). Providing the RIS/smart repeater (108, 208) with the periodicity and beamforming matrix information about SSB will help the RIS/smart repeater (108, 208) to beamform SSB whenever the SSB is transmitted by the BS (102, 202). The BS (102, 202) need not provide the beamforming matrix every time for SSB transmission which will reduce the signaling overhead.

Figure 3:
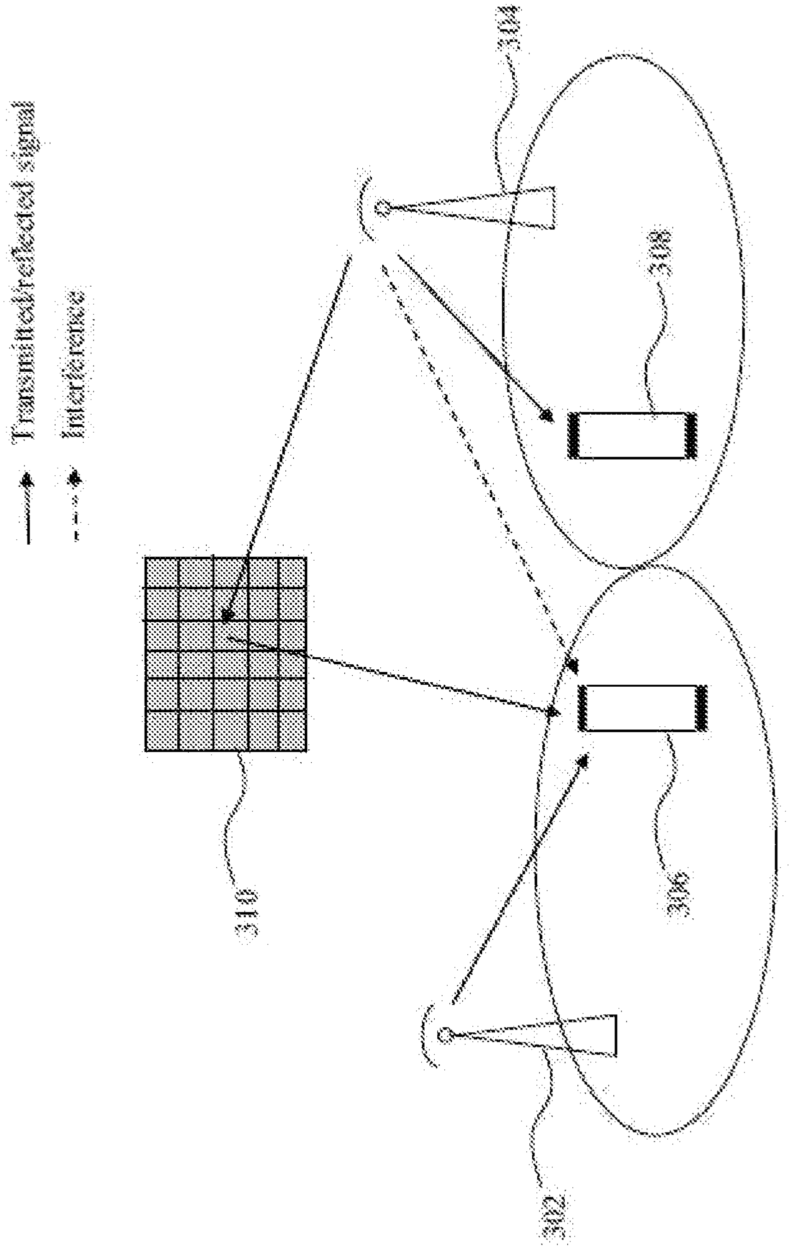
FIG. 3 illustrates an exemplary network implementing interference mitigation using an RIS, in accordance with an embodiment of the present invention.

In one implementation, the RIS can also be used to reduce/mitigate interference experienced by a node in the network. Such process of interference mitigation is described henceforth with reference to FIG. 3 illustrating an exemplary network implementing interference mitigation using an RIS. UE 1 (306) is served by BS 1 (302) and UE 2 (308) is served by BS 2 (304) in downlink (DL). A signal transmitted by the BS 2 (304) to the UE 2 (308) will cause interference at reception of the UE 1 (306), as shown in FIG. 2. An RIS (310) is used to mitigate this interference, where the BS2 (304) transmits the second signal to the UE2 (308) through the RIS (310). A beamforming matrix at the RIS (310) is adjusted in such a way that a signal reflected from the RIS (310) and the interference at the UE 1 (306) destructively combine at the UE 1 (306) to mitigate the interference.

In case of the interference mitigation, the BS (302, 304) or the network may configure the beamforming matrix at the RIS (310) such that the reflected signal from the RIS (310) cancels/reduces the interference or any unwanted signal at some location in the network. Further, to aid the process of interference cancellation, the network may schedule additional transmission towards the RIS (310). For example, the beamforming matrix at the RIS (310) may need to be updated by either the BS 1 (302) based on interference feedback at the UE 1 (306) or by the network such that the reflected signal from the RIS (310) cancels the interference at the UE 1 (306). A second beam may be transmitted by the BS 2 (304) as mentioned earlier. The BS 1 (302) or the network may inform the BS 2 (304) about transmission of the second beam and a direction of transmission of the second beam.

In one implementation, the resource configuration and the scheduling information as mentioned earlier, may be provided to the RIS/smart repeater (108, 208, 310) for efficient operation. For example, if the smart repeater is aware of whether it is transmitting in DL to the UE (104, 106, 204, 206, 306, 308) or receiving in UL from the UE (104, 106, 204, 206, 306, 308) at a given time instant, then the smart amplifier amplifies the signal in a relevant direction. Otherwise, the RIS/smart repeater (108, 208, 310) will be receiving signals or transmitting signals equally in all directions which results in interference issues and power/resource wastage. Also, the RIS/smart repeater (108, 208, 310) may operate in sleep mode or a low power mode during absence of transmission/reception, to reduce energy consumption. In all the above-described cases, the control information is sent to the RIS/smart repeater (108, 208, 310) by the BS (102, 202, 302, 304) or by the network.

In one implementation, the RIS/smart repeater (108, 208, 310) determines the scheduling information and the resource configuration by decoding the scheduling information and the resource configuration transmitted by the BS (102, 202, 302, 304) to the UE (104, 106, 204,206, 306, 308).

In one aspect, the RIS/smart repeater (108, 208, 310) determines the scheduling information and the resource configuration by decoding the scheduling information and the resource configuration transmitted as control information by the BS (102, 202, 302, 304) to the RIS/smart repeater (108, 208, 310).

In one implementation, the RIS/smart repeater (108, 208, 310) determines beamforming in time resources based on the scheduling information and the resource configuration.

In one aspect, the RIS/smart repeater (108, 208, 310) does not perform transmission and reception of any signal or at least one of data signal, control signal and reference signal in sleep mode.

In one aspect, the RIS/smart repeater (108, 208, 310) reduces the transmit power for the data signal, control signal and reference signal in low transmit power mode.

In one implementation, the sleep mode and the low transmit power mode is determined by implicitly based on the scheduling information and the resource configuration.

In one aspect, the sleep mode and the low transmit power mode is determined by decoding the sleep mode information and the low transmit power mode information transmitted as control information by the BS (102, 202, 302, 304) to the RIS/smart repeater (108, 208, 310).

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

What is claimed is:

1. A method of communication in a cellular network, the method comprising:

establishing, by at least one first node, a connection with at least one second node;

transmitting, by the at least one first node, control information to the at least one second node, wherein the control information comprises a beamforming information and at least one first time resource where the control information is to be applied, wherein transmitting the control information is using at least one of a dedicated channel and a shared channel, wherein transmitting is in at least one of:

time-frequency resources in at least one of a guard symbol and a guard band of a channel used for communication between the at least one first node and at least one third node, and time-frequency resources overlapping with the time-frequency resources used for communication between the at least one first node and the at least one third node; and, performing, by the at least one first node, at least one operation with the at least one third node through the at least one second node in the at least one first time resource, wherein the at least one operation comprises one of transmitting a signal to the at least one third node and receiving a signal from the at least one third node.

2. The method as claimed in claim 1, wherein the first node is at least one of a Base Station (BS), an Integrated Access and Backhaul (IAB) node, and a Distributed Unit (DU), the second node is at least one of a smart repeater and a Reconfigurable Intelligent Surface (RIS), and the third node is at least one of the smart repeater, the RIS, IAB node, DU, and a User Equipment (UE).

3. The method as claimed in claim 1, wherein establishing further comprises at least one of:

transmitting, by the at least one first node, capability to support the at least one second node, receiving, by the at least on first node, at least one of:

at least one second node indication, capability information of the at least one second node, location of the at least one second node and availability of the at least one second node, calibrating, by the at least one first node, a channel among one or more of the at least one first node, the at least one second node, and the at least one third node transmitting, by the at least one first node, calibration information, and determining, by the at least one first node, the control information based on the calibration information.

4. The method as claimed in claim 3, wherein receiving is from at least one of:

at least one cellular network, the at least one second node, and the at least one third node;

in response to sending a request by the at least one first node; and implicitly deriving, by the at least one first node, the capability of the at least one second node in performing channel estimation.

5. The method as claimed in claim 3, wherein the capability information comprises at least one of:

configuration of at least one element, at least one number of at least one of phase shifts and amplitude levels supported by the at least one element, at least one value of at least one of phase shifts and amplitude levels supported by the at least one element, number of panels, mutual coupling between the at least one element, range of angle of incidence of an incoming beam, operating frequency range, frequency response, receiver capability, capability of performing channel estimation, and mobility information.

6. The method as claimed in claim 5, wherein the at least one element comprises at least one of meta-element and antenna element.

7. The method as claimed in claim 1, wherein calibrating the channel further comprises at least one of:

estimating, by the at least one first node, the channel between the at least one first node and the at least one second node, estimating, by the at least one first node, the channel between the at least one first node and the at least one third node, and estimating, by the at least one first node, the channel between the at least one second node and the at least one third node.

8. The method as claimed in claim 1, wherein transmitting the control information further comprises at least one of multiplexing the control information with at least one of a control signal, a reference signal (RS), and data signals of the at least one third node using at least one of time division multiplexing (TDM), frequency division multiplexing (FDM), code division multiplexing (CDM), spatial division multiplexing (SDM), non-orthogonal multiple access (NOMA), and multi-user multiple input multiple output (MIMO) techniques; and configuring, by at least one of the cellular network and the at least one first node, parameters used for transmission of the control information, wherein the parameters are at least one of: at least one second time resource, at least one frequency resource, multiplexing modes, and periodicity.

9. The method as claimed in claim 1, wherein the control information comprises at least one of:

location information of the at least one third node, capability of the at least one second node, channel information between at least one of:

the at least one first node and the at least one second node, the at least one second node and the at least one third node, and the at least one first node and the at least one third node, and a feedback from the at least one third node regarding signal quality at the at least one third node at least one third time resource for at least one second node to operate in one of sleep mode and low power mode scheduling information of the at least one third node, identity of the at least one third node, and time division duplexed (TDD) configuration wherein the TDD configuration indicates the at least one first time resource as one of downlink (DL) and uplink (UL).

10. The method as claimed in claim 1, wherein the beamforming information comprises at least one of:

at least one value of at least one of phase shifts and amplitude levels supported by at least one element, identity of a beam, direction of beamforming, and a periodicity information.

11. The method as claimed in claim 10, wherein the at least one value of at least one of phase shifts and amplitude levels is represented by a beamforming matrix from a codebook wherein the codebook is at least one of:

determined by the at least one first node, received by the at least one first node, and predefined, wherein the codebook determined by the at least one first node is informed to the at least one second node.

12. The method as claimed in claim 10, wherein the at least one element comprises at least one of meta-element and antenna element.

13. The method as claimed in claim 10, wherein receiving the control information further comprises:

activating, by the at least one second node, at least one of a sleep mode, and a low transmit power mode in at least one third time resource.

14. The method as claimed in claim 13, wherein the sleep mode comprises turning off by the at least one second node, at least one of transmission and reception of at least one of data signal, control signal, and reference signal, and the low transmit power mode comprises reducing the transmit power for at least one of the data signal, the control signal, and the reference signal by the at least one second node.

15. The method as claimed in claim 1, wherein performing the at least one operation reduces interference at one of the at least one first node and the at least one third node.

16. A method of communication in a cellular network, the method comprising:

establishing, by at least one second node, a connection with at least one first node;

receiving, by the at least one second node, control information from the at least one first node, wherein the control information comprises a beamforming information and at least one first time resource where the control information is to be applied, wherein receiving the control information is using at least one of a dedicated channel and a shared channel, and beamforming, by the at least one second node, signals in the at least one first time resource based on the control information, wherein beamforming the signals comprises one of:

receiving a first signal from the at least one first node and transmitting an amplified first signal to the at least one third node and receiving a first signal from the at least one third node and transmitting an amplified first signal to the at least one first node.

17. The method as claimed in claim 16, wherein receiving the first signal is using a first beam and transmitting a second signal is using a second beam.

18. The method as claimed in claim 16, wherein establishing further comprises at least one of:

receiving, by the at least one second node, capability of the at least one first node to support the at least one second node, transmitting, by the at least one second node, at least one of:

at least one second node indication, location of the at least one second node, availability of the at least one second node, and capability information of the at least one second node, and calibrating, by the at least one second node, a channel among one or more of the at least one first node, the at least one second node, and the at least one third node.

19. The method as claimed in claim 18, wherein calibrating the channel further comprises at least one of:

determining, by the at least one second node, a beamforming matrix based on calibration information, determining, by the at least one second node, a codebook based on calibration information, and reporting, by the at least one second node, the calibration information to the at least one first node.

20. The method as claimed in claim 19, wherein calibrating the channel comprises:

receiving, by the at least one second node, at least one of a reference signal (RS) configuration and a scheduling information from the at least one first node, measuring by the at least one second node, RS transmitted by at least one of the at least one first node and the at least one third node based on at least one of the RS configuration and the scheduling information, and estimating, by the at least one second node, the channel between at least one of the at least one first node and the at least one second node, and the at least one second node and the at least one third node.

21. The method as claimed in claim 18, wherein the capability information comprises at least one of:

configuration of at least one element, at least one number of at least one of phase shifts and amplitude levels supported by the at least one element, at least one value of at least one of phase shifts and amplitude levels supported by the at least one element, number of panels, mutual coupling between the at least one element, range of angle of incidence of an incoming beam, operating frequency range, frequency response,
receiver capability,
capability of performing channel estimation, and
mobility information.

22. The method as claimed in claim 21, wherein the at least one element comprises at least one of meta-element and antenna element.

23. The method as claimed in claim 16, wherein the control information further comprises at least one of:
at least one third time resource for at least one second node to operate in one of sleep mode and low power mode
scheduling information of the at least one third node,
identity of the at least one third node, and
time division duplexed (TDD) configuration
wherein the TDD configuration indicates the at least one first time resource as one of downlink (DL) and uplink (UL)
location information of the at least one third node
a feedback from the at least one third node regarding signal quality at the at least one third node; and
channel information between at least one of:
the at least one first node and the at least one second node,
the at least one second node and the at least one third node, and
the at least one first node and the at least one third node.

24. The method as claimed in claim 23, wherein when
the TDD configuration indicates the at least one first time resource as DL, beamforming the signals comprises receiving the first signal from the at least one first node and transmitting the amplified first signal to the at least one third node; and
the TDD configuration indicates the at least one first time resource as UL, beamforming the signals comprises receiving the first signal from the at least one third node and transmitting the amplified first signal to the at least one first node.

25. The method as claimed in claim 16, wherein receiving the control information further comprises:
receiving, by the at least one second node, configuration for receiving the control information,
wherein the configuration comprises at least one of at least one second time resource, at least one frequency resource, multiplexing modes, and periodicity.

26. The method as claimed in claim 16, wherein the beamforming information comprises at least one of:
at least one value of phase shift for at least one element,
at least one value of amplitude level for the at least one element,
a beamforming matrix from a codebook;
identity of a beam,
direction of beamforming, and
a periodicity information.

27. The method as claimed in claim 16, wherein receiving the control information further comprises operating, by the at least one second node, in one of sleep mode and low power mode in at least one third time resource;
wherein the at least one third time resource is non-overlapping with the at least one first time resource.

28. The method as claimed in claim 27, wherein the sleep mode comprises turning off by the at least one second node, at least one of transmission and reception of at least one of data signal, control signal, and reference signal.

* * * * *